3,106,558
PROCESS FOR THE PREPARATION OF
PIPERAZINES
Fedor Poppelsdorf, Charleston, and Richard C. Myerly, South Charleston, W. Va., assignors to Union Carbide Corporation, a corporation of New York
No Drawing. Filed July 20, 1960, Ser. No. 44,007
7 Claims. (Cl. 260—268)

This invention relates to a novel process for the preparation of piperazine and alkyl substituted piperazines.

More specifically, this invention relates to an improvement in the process of preparing piperazines by the pyrolysis of a hydrohalide salt of an aminoethylethanolamine.

The starting materials of this invention can be represented by the following formulas:

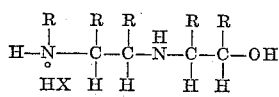

and

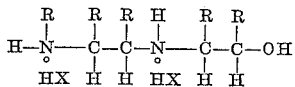

wherein R represents hydrogen or alkyl groups having from 1 to 4 carbon atoms and X represents bromine, chlorine, fluorine or iodine.

As can be seen from the formulas, the material which is pyrolyzed can be either a mono- or dihydrohalide.

Illustrative examples of aminoethylethanolamine hydrohalide salts include the mono- and di-hydrochlorides, bromides and iodides of 2(2'-aminoethylamino)ethanol
1-methyl-2(2'-aminoethylamino)ethanol
1-ethyl-2(2'-aminoethylamino)ethanol
1-butyl-2(2'-aminoethylamino)ethanol, etc.

The preferred class of starting materials are the dihydrochloride salts. The particularly preferred aminoethanol salt is the dihydrochloride of 2(2'-aminoethylamino)ethanol.

The preparation of piperazine by the pyrolysis of the above-mentioned hydrohalide salts is known in the art. However, the temperatures that had to be employed were quite high.

Thus, it is an object of this invention to provide a process for the preparation of piperazine which can be efficiently operated at lower temperatures than had heretofore been possible.

It is an other object of this invention to provide a process for the production of piperazine which gives higher productivities at a given temperature than had heretofore been possible.

The advantages of using lower temperatures is apparent when it is realized that carbonization of the pyrolysis product increases with increasing reaction temperatures. The use of lower temperatures results in less carbonization of the product so that it flows more easily. The ease of flow is an important factor for a continuous process.

It has now been discovered that the above objects can be obtained by carrying out the pyrolysis in the presence of an anhydrous hydrogen halide catalyst selected from the class consisting of hydrogen chloride, hydrogen bromide, hydrogen iodide and hydrogen fluoride. The preferred catalyst is hydrogen chloride.

The effect of the catalyst on the yields of piperazine can be shown from the following table in which the catalyst is hydrogen chloride and the ethanolamine is 2(2'-aminoethylamino)ethanol dihydrochloride.

TABLE I

| Reaction a Temperature, ° C. | Reaction Time, Minutes | Hydrogen Chloride Passed Through Reaction Mass | Yield of Piperazine, Percent |
|---|---|---|---|
| 205–211 | 60 | Yes b | 59.3 |
| 207–212 | 60 | No | 30.2 |
| 209–213 | 90 | No | 39.6 |
| 245–250 | 30 | Yes b | 54.5 |
| 245–250 | 30 | No | 38.9 | a All experiments were done at atmospheric pressure with continuous stirring.
b Hydrogen chloride gas passed into the reaction mass at the rate of 2.22 moles per hour per mole of 2(2'-aminoethylamino)ethanol dihydrochloride.

The temperatures at which the reaction can be conducted are from about 205°,290° C. The preferred range is about 205°–265° C. at atmospheric pressure, with 205°–220° C. being particularly preferred.

The amount of anhydrous hydrogen halide gas employed is dependent upon the pressure at which the pyrolysis is conducted. Less gas is needed at superatmospheric pressures than at atmospheric pressures since the hydrogen halides are more soluble in the reaction mixture at higher pressures. It would appear that the minimum flow necessary at any temperature is that flow which maintains a ratio of 2 moles of anhydrous hydrogen halide to 1 mole of the amine.

At atmospheric pressures, flow rates within the range of 0.1 to 10 moles of anhydrous hydrogen halide per hour per mole of dihydrohalide salt can be employed. The preferred flow rate is 2.22 moles per hour.

The hydrohalide salts can be prepared by passing the necessary stoichiometric quantities of anhydrous halide into the aminoethylethanolamine.

The pyrolysis can be carried out in the presence of an inert dispersant if it is desired. The dispersant is not critical and any liquid inert under the reaction conditions, can be employed. Examples of dispersants include mineral oil, diphenyl ether, penhyl diphenyl ether, etc.

The following examples illustrate the novel process of this invention.

*Example I*

Anhydrous hydrogen chloride (328.5 g., 9 moles) was slowly passed with stirring into 2(2'-aminoethylamino) ethanol (469 g., 4.5 moles). The resulting dihydrochloride was rapidly heated with stirring to 207° to 212° C., whereupon anhydrous hydrogen chloride was passed continuously through the molten dihydrochloride at the rate of 10.0 moles per hour, the gas being introduced by means of a sparging tube placed as far below the liquid surface as possible.

The reaction mass was held with stirring under these conditions for 1.0 hour.

At the end of the reaction period, the product was cooled to about 120° C. and then made strongly alkaline to phenolphthalein by the addition of sodium hydroxide solution (aqueous 50 percent).

Diethylenetriamine (500 g.) was added to serve as a distillation aid and pot-boiler after which the mixture was distilled with stirring at atmospheric pressure. Piperazine (230.0 g.) distilled over a yield of 59.3 percent.

EXAMPLE II

The procedure of Example I was followed exactly excepting that the reaction temperature was kept at 207° to 212° C. and the hydrogen chloride treatment was omitted. Piperazine was obtained in a yield of 30.2 percent.

EXAMPLE III

The procedure of Example II was repeated but with a reaction time of 1.5 hours. Piperazine was obtained in a yield of 39.6 percent.

EXAMPLE IV

2(2'-aminoethylamino)ethanol dihydrochloride (4.5 moles) was rapidly heated with stirring to 205° to 213° C. whereupon anhydrous hydrogen bromide was passed continuously through the molten dihydrochloride at the rate of 2.35 moles per hour, the gas being introduced by means of a sparging tube placed as far below the liquid surface as possible.

The reaction mass was held with stirring under these conditions for 1.0 hour.

At the end of the reaction period, the product was cooled to about 120° C. and then made strongly alkaline to phenolphthalein by the addition of sodium hydroxide solution (aqueous 50 percent).

Diethylene triamine (500 g.) was added to serve as a distillation aid and pot-boiler after which the mixture was distilled with stirring at atmospheric pressure. Piperazine (28.0 g.) distilled over in a yield of 58.9 percent.

EXAMPLE V

The procedure of Example I was followed excepting that the reaction was done at 245° to 250° C. and the reaction time was 30 minutes. Piperazine was obtained in a yield of 54.5 percent.

EXAMPLE VI

Example V was repeated but with omission of the hydrogen chloride treatment. Piperazine was secured in a yield of 38.9 percent.

What is claimed is:
1. In the process for preparing piperazine by the pyrolysis of a hydrohalide of an ethanolamine having the formula:

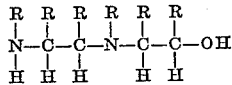

wherein R is selected from the class consisting of hydrogen and alkyl groups having from 1 to 4 carbon atoms, the improvement which comprises the step of passing anhydrous hydrogen halide through the ethanolamine hydrohalide maintained at a temperature of from about 205° C. to 290° C. at the rate of at least 0.1 mole of anhydrous hydrogen halide per hour per mole of the ethanolamine hydrohalide.

2. The process of claim 6 wherein the ethanolamine hydrohalide is 2(2'-aminoethylamino)ethanol hydrochloride.

3. The process of claim 4 wherein the reaction is conducted in an inert liquid dispersant.

4. The process of claim 1 wherein the rate at which the anhydrous hydrogen halide is passed through the ethanolamine hydrohalide maintains a ratio of at least 2 moles of hydrogen halide per mole of the ethanolamine.

5. The process of claim 4 wherein the temperature is 205° C. to 265° C.

6. The process of claim 5 wherein the ethanolamine hydrohalide is the ethanolamine hydrochloride and the anhydrous hydrogen halide is hydrogen chloride.

7. In the process for preparing piperazine by the pyrolysis of 2(2'-aminoethylamino)ethanol hydrohalide, the improvement which comprises the step of passing anhydrous hydrogen chloride through the 2(2'-aminoethylamino)ethanol hydrohalide amintained at a temperature from 205° C. to 265° C. at a rate of 0.1 to 10 moles of anhydrous hydrogen halide per hour per mole of the 2(2'-aminoethylamino)ethanol hydrogen halide.

References Cited in the file of this patent
UNITED STATES PATENTS

| | | |
|---|---|---|
| 2,835,673 | Langdon | May 20, 1958 |
| 2,843,590 | Scigliano et al. | July 15, 1958 |
| 2,875,206 | Levis et al. | Feb. 24, 1959 |

FOREIGN PATENTS

| | | |
|---|---|---|
| 215,436 | Australia | Apr. 5, 1956 |
| 788,121 | Great Britain | Dec. 23, 1957 |
| 816,037 | Great Britain | July 8, 1959 |